(12) United States Patent
Martek et al.

(10) Patent No.: US 6,522,897 B1
(45) Date of Patent: Feb. 18, 2003

(54) RF RADIATION PATTERN SYNTHESIS USING EXISTING LINEAR AMPLIFIERS

(75) Inventors: Gary Allen Martek, Edgewood; Martin J. Feuerstein, Redmond; Douglas O. Reudink, Kirkland, all of WA (US)

(73) Assignee: Metawave Communication Corporation, Redmond, WA (US)

( * ) Notice: Subject to any disclaimer, the term of this patent is extended or adjusted under 35 U.S.C. 154(b) by 0 days.

(21) Appl. No.: 09/357,417

(22) Filed: Jul. 20, 1999

(51) Int. Cl.[7] ............................................... H04M 1/00
(52) U.S. Cl. ........................................ 455/562; 455/561
(58) Field of Search ................................ 455/561, 562, 455/101, 103, 126, 91, 114, 115, 116; 330/124 R, 295; 342/372, 373, 374

(56) References Cited

U.S. PATENT DOCUMENTS

| | | | | |
|---|---|---|---|---|
| 5,894,598 A | * | 4/1999 | Shoki | 455/562 |
| 5,907,816 A | * | 5/1999 | Newman et al. | 455/562 |
| 5,917,371 A | * | 6/1999 | Chesarek et al. | 330/124 R |
| 6,006,111 A | * | 12/1999 | Rowland | 455/561 |
| 6,104,935 A | * | 8/2000 | Smith et al. | 455/562 |
| 6,133,868 A | * | 10/2000 | Butler et al. | 342/174 |
| 6,178,333 B1 | * | 1/2001 | Feuerstein et al. | 455/503 |
| 6,188,373 B1 | * | 2/2001 | Martek | 343/893 |
| 6,233,434 B1 | * | 5/2001 | Takei | 455/103 |

\* cited by examiner

*Primary Examiner*—Vivian Chin
*Assistant Examiner*—Duc Nguyen
(74) *Attorney, Agent, or Firm*—Fulbright & Jaworski L.L.P.

(57) ABSTRACT

There is disclosed an RF synthesis system for allowing a phase signal to be created from a plurality of antennas while using a single LPA for each panel of the array. Provision is made to control the power levels between the antennas of each panel by a series of phase adjustments used in conjunction with RF hybrid circuits. Provision is made for changing the sector alignment by using cross panels and also by rearranging the signals from the various RF inputs.

9 Claims, 8 Drawing Sheets

RF RADIATION PATTERN SYNTHESIS USING EXISTING LINEAR AMPLIFIERS

RELATED APPLICATIONS

Reference is also made to the following co-pending, commonly assigned U.S. Patent Applications entitled SYSTEM AND METHOD FOR PER BEAM ELEVATION SCANNING, Ser. No. 09/5/034,471, SYSTEM AND METHOD FOR FULLY SELF-CONTAINED CALIBRATION OF AN ANTENNA ARRAY, Ser. No. 09/092,429 and SYSTEM AND METHOD PROVIDING DELAYS FOR CDMA NULLING, Ser. No. 09/060,921, all of which are incorporated herein by reference.

TECHNICAL FIELD

This invention relates to the synthesis of RF radiation pattern to create a phased array using a plurality of antennas and more particularly to a system and method for generating such RF patterns from a plurality of antennas using a number of linear power amplifiers (LPAs) less than the number of antennas and even more particularly to systems and methods for using the same number of LPAs as are currently used in non-phased array antenna systems.

BACKGROUND

It is often desirable to provide a signal simultaneously in multiple beams of a multibeam antenna system. For example, a cellular communication system may provide communications between a base transceiver station (BTS), having an antenna system associated therewith, and a plurality of mobile units operating within a predefined area, or "cell," defined by the antenna system's radiation pattern. Often such cells, although providing communications in a full 360° about the BTS, are broken down into three 120° sectors in order to provide more capacity and less interference over that of an omni cell 360° system. Additionally, such a sectorized cell achieves extended range as compared to an omni cell 360° system due to the greater signal gain at the sector antennas resulting from their more focused coverage.

Further advantage may be realized by providing multiple narrow beams at the BTS rather than the three 120° sectors. For example, twelve 30° narrow antenna beams may be utilized to provide the same 360° communication coverage within the cell as the 360° omni cell configuration and its 120° sectorized cell replacement. Such a multiple narrow beam arrangement is desirable because, as with the 120° sector system described above, the multiple beams provide a greater signal gain resulting from their greater focused coverage. A further advantage of the multiple narrow beams is the flexibility offered in synthesizing any desired sector size by combining/phasing such beams. Combining adjacent narrow beams provides a wider composite beam, with a beam width roughly equal to the sum of the individual beams widths. Accordingly, synthesized sectors may be formed of any size by simulcasting a signal on selected ones of the narrow beams. The sector could be as narrow as a single beam or as wide as desired by using multiple beams.

The multiple antenna beams of a communication system may be generated through use of a planar or cylindrical array of antenna elements, for example, where a signal is provided to the individual antenna elements having a predetermined phase relationship (i.e., a phased array). This phase relationship causes the signal simulcast from the various antenna elements of the array to destructively and beneficially combine to form the desired radiation pattern. There are a number of methods of beam forming using matrix type beam forming networks, such as Butler matrixes.

Controlling interference experienced in wireless communication, such as may be caused by multiple users of a particular service and/or various radiating structures of a service or different services providing communication coverage within the same or different geographical areas, is a concern. Moreover, as the use of wireless communications increases, such as through the deployment of new services and/or the increased utilization of existing services, the need for interference reduction schemes becomes more pronounced.

For example, in code division multiple access (CDMA) networks a number of communication signals, each associated with a different user or communication unit, operate over the same frequency band simultaneously. Each communication unit is assigned a distinct, pseudo-random, chip code which identifies signals associated with the communication unit. The communication units use this chip code to pseudo-randomly spread their transmitted signal over the allotted frequency band. Accordingly, signals may be communicated from each such unit over the same frequency band and a receiver may despread a desired signal associated with a particular communication unit.

However, despreading of the desired communication unit's signal results in the receiver not only receiving the energy of this desired signal, but also a portion of the energies of other communication units operating over the same frequency band. Accordingly, CDMA networks are interference limited, i.e., the number of communication units using the same frequency band, while maintaining an acceptable signal quality, is determined by the total energy level within the frequency band at the receiver. Therefore, it is desirable to limit reception of unnecessary energy at any of the network's communication devices.

In the past, interference reduction in some wireless communication systems, such as the aforementioned CDMA cellular systems, has been accomplished to an extent through physically adjusting the antenna array to limit radiation of signals to within a predefined area. Accordingly, areas of influence of neighboring communication arrays may be defined which are appreciably smaller than the array is capable of communicating in. As such, radiation and reception of signals is restricted to substantially only the area of a predefined, substantially non-overlapping, cell.

Changes in the environment surrounding a communication array or changes at a neighboring communication array may require adjustment of the radiation pattern of a particular communication array. Specifically, seasonal changes around a base transceiver station (BTS) site can cause changes in propagation losses of the signal radiated from a BTS. For example, during fall and winter deciduous foliage loss can cause a decrease in signal path loss. This can result in unintentional interference into neighboring BTS operating areas or cells as the radiation pattern of the affected BTS will effectively enlarge due to the reduced propagation losses.

Likewise, an anomaly affecting a neighboring BTS may cause an increase in signal path loss, or complete interruption in the signal, therefore necessitating the expansion of the radiation patterns associated with various neighboring BTS's in order to provide coverage in the affected areas.

One solution to the problem of creating a phased array has been to use twelve antennas arranged into three panels with each panel having four antennas thereon. A typical system of this type is shown in FIGS. 6 and 7 where it will be noted that there are at least twelve LPAs utilized, one for each antenna column. Also, it should be noted that any reference herein to an antenna or an antenna array includes an antenna column made up of a plurality of elements. Control of such an antenna column is detailed in the above-mentioned copending application entitled SYSTEM AND METHOD FOR PER BEAM ELEVATION SCANNING.

In systems which existed prior to the system shown in FIGS. 6 and 7, particularly in CDMA systems, there is typically only one LPA per panel (sector) which provides RF signals to a single antenna, or to a set of antennas having a relatively fixed radiation pattern. In such systems there is no ability to control, or snythesize, the radiation pattern to maximize utilization. For such synthesis to occur and thus control the radiation pattern, it is necessary to control the power and the relative phase of the RF signals which arrive at the antenna.

Thus, in addition to the LPAs being costly, if twelve LPAs were to be used (one for each antenna), their use would require the removal, or at least the rewiring of, the existing LPAs plus the addition of at least nine additional LPAs. This is costly and inefficient.

In addition, since LPA themselves are costly items (the cost partially dependent upon the amount of power being handled) and because the amount of power delivered to the antenna is critical to the proper operation of the system, it is critically important that power not be lost (or the loss minimized) after the LPA stage.

A further difficulty arises when it is desired to change the orientation of the radiation pattern so that antennas positioned on different panels create the sector. Thus, assume that the four antennas of each panel work together in a phase relationship to create three sectors each covering, for example, 120°. Now let us assume that it is desired to use two antennas from one panel combined in a phase relationship with two antennas from an adjacent panel to change the sector physical dimensions. In order to achieve this new relationship the synthesis of the signals must be changed to reflect the new radiation pattern.

Accordingly, a need exists for a multiple phase array of antennas to be controlled using a single LPA per panel.

Accordingly, a further need exists in the art for an antenna system in which RF signals are processed after the power amplification stage to provide synthesized signals while not creating a significant power loss.

A further need exists in the art for such a system in which the synthesis of radiated sectors can be created using antennas from different panels.

A still further need exists in the art where each panel of a multipanel antenna system has a single LPA feeding RF power to the panel.

SUMMARY OF THE INVENTION

These and other objects, features and technical advantages are achieved by a system and method where only a single LPA per panel is utilized to control RF signals to that panel. The circuitry between the LPA and the antenna panels serves to first double (split) and then double (split) again the output of the LPA so that there are ultimately four distinct signals, each having its own power and phase relationship, for presentation to the four antennas of the antenna panel.

The power levels are adjusted by the use of a two by two (two inputs and two outputs) hybrid with a phase adjustment in at least one of its inputs. The phase adjustment serves to control the relative power output between the two outputs. These two outputs are each provided to splitters for creating two signal pairs. Each signal pair is again fed through a two by two hybrid circuit and the relative phase of one signal of each pair is adjusted to yield the desired output power levels. Thus, there is created four signals (each for presentation to a different antenna) each having selective power, all coming from a single LPA. Phase control is applied to each of the four signals just prior to the antenna so as to control the physical dimensions of the radiation pattern.

Prior to the RF signal arriving at the single LPA associated with a particular panel there is provided, if desired, circuitry which allows the RF from any of the three inputs to be directed to any of the other panels, thereby allowing for cross panel control, as well as reversal, of the sectors.

Accordingly, it is one technical advantage of the invention that a single LPA controls multiple antennas of a sector, each antenna having a controllable power level and phase relationship with respect to the other antennas in that sector.

It is a further technical advantage of the invention that the power levels between the antennas of each sector is adjusted relative to each other so as to minimize power waste.

It is a still further technical advantage of the invention that the single LPA of each sector can be directed to control antennas in different sectors, thereby allowing greater flexibility in sector boundary management.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

Figure 6:
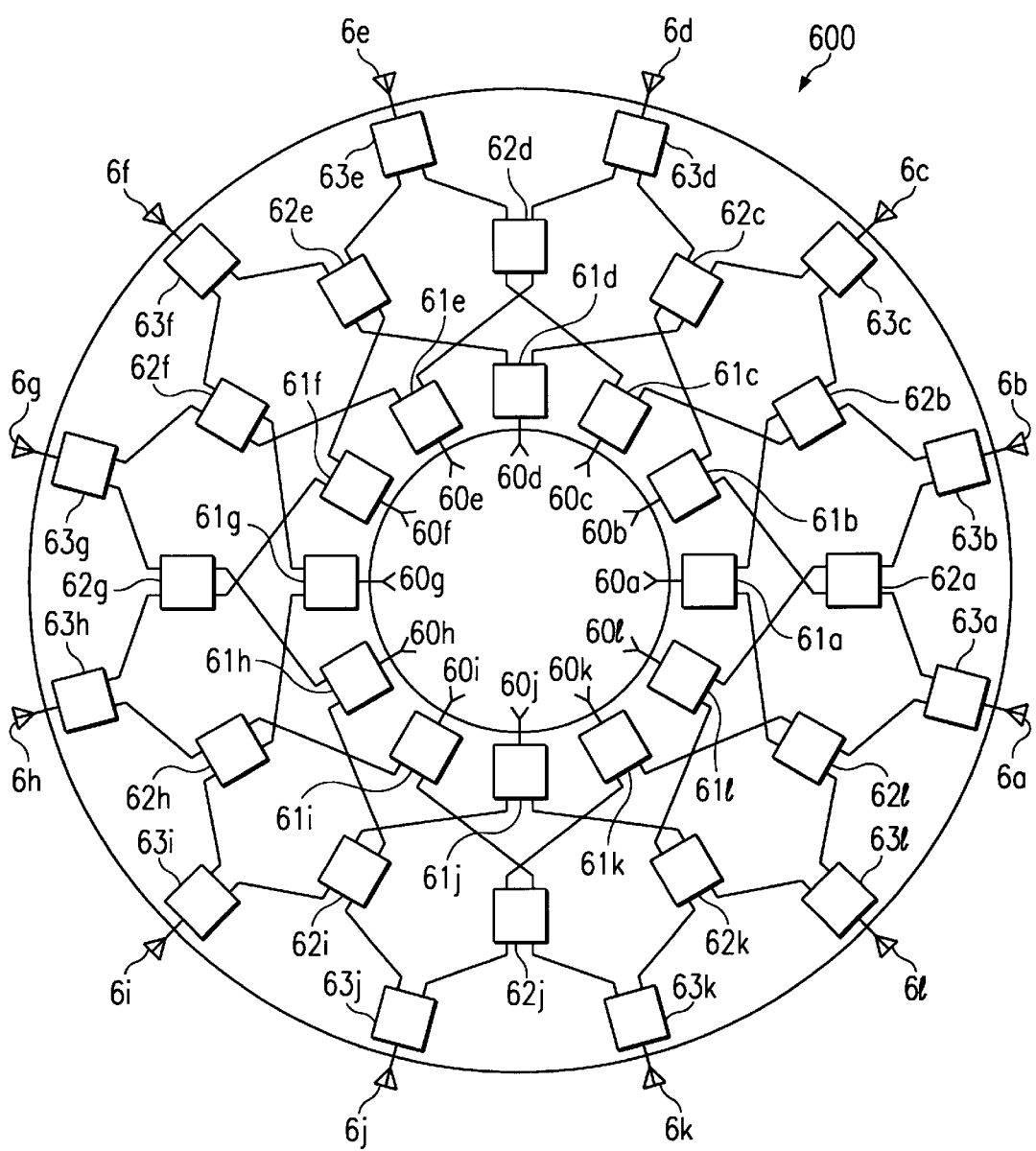
FIGS. 6 and 7 show prior art systems.
Figure 7:
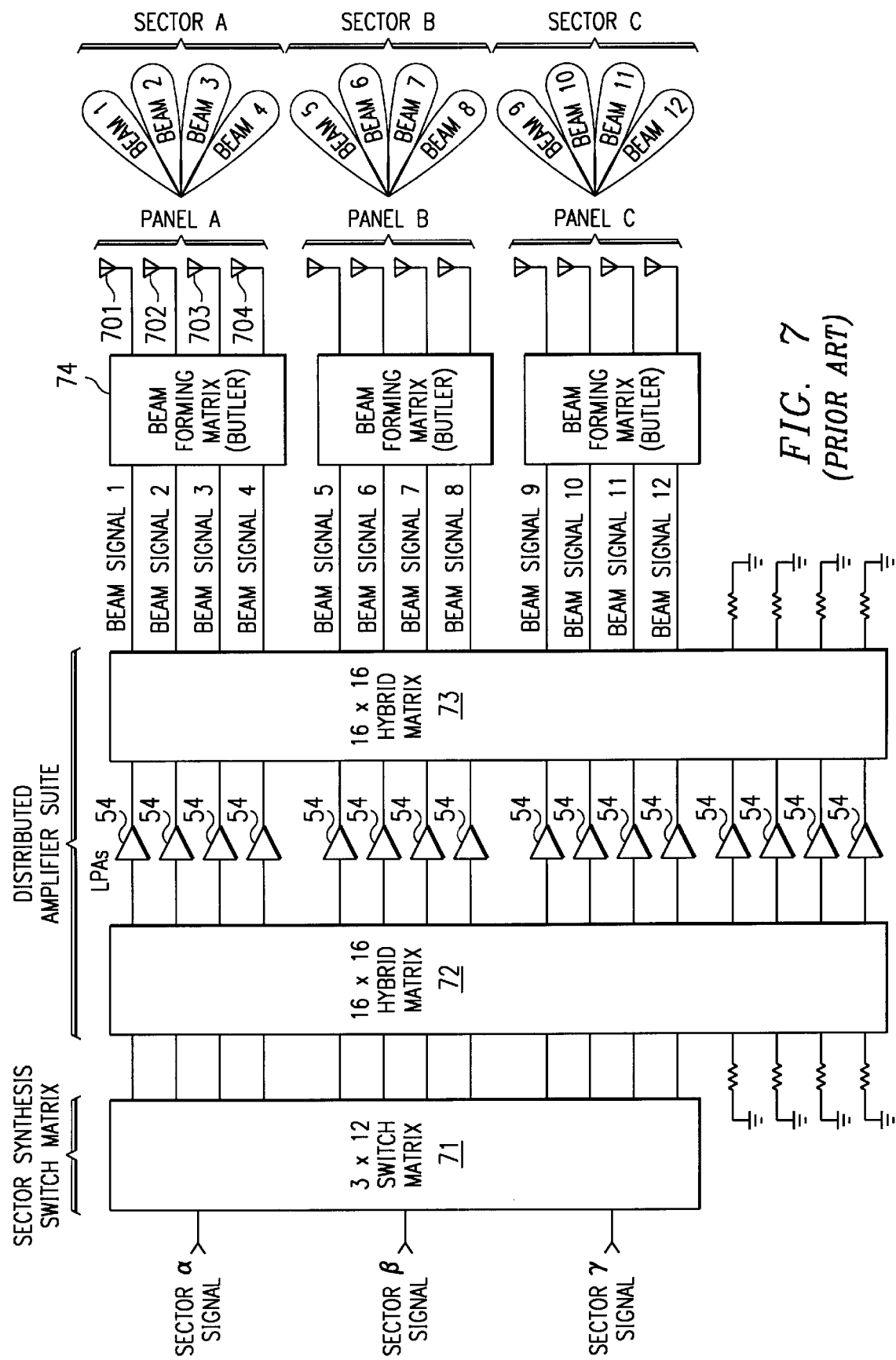

Before beginning a discussion of the invention, it might be helpful to briefly review, with respect to FIGS. 6 and 7, the operation of multi-beam antenna systems as found in the prior art.

FIG. 6 shows a feed network wherein feed networks 60a–60l of radiator columns 6a–6l are interconnected, through the use of splitters and combiners 61a–61l, 62a–62l, and 63a–63l, to form radiator column feed control network 600 controlling beam forming by exciting co-located columns.

In the case of a transmitter (TX), the energy centers at one or more of the coax connectors or inputs 60a–60l. For each connector, such as connector 61c, the energy is equally divided by divider 61c. The energy is split evenly and arrives at splitters 62b and 62d. That energy is divided by splitter 62b coming out as 0° and −90°, and by splitter 62d, coming out as −90° and 0°. This energy is then routed to combiners 63b, 63c, 63d and 63e, which illuminates or excites antenna columns 6b, 6c, 6d and 6e, respectively. The object is that energy enters connector 61c and is supplied to four antenna columns such that reading across from left to right the phase of the energy is at 0° at antenna 6b, −90° at antenna 6c, −90° at antenna 6d, and 0° at antenna 6e. This topology creates a beam, associated with a signal input at a particular input port, defined by four antenna columns which are illuminated in this manner.

Elements in FIG. 6, labeled 61a through 61l, are called "Wilkinson combiners." Each of the elements 61a through 61l have a single input, labeled as 60a through 60l respectively, which is divided into two outputs. Energy coming out of the elements is split but in phase. This is an in-phase power splitter. Elements 63a through 63l are also "Wilkinson combiners," although here they are disposed to perform oppositely to elements 61a through 61l, i.e., in the transmit signal path elements 61a through 61l operate to split a signal whereas elements 63a through 63l operate to combine signals.

Elements 62a through 62l have two inputs, associated with elements 61a through 61l, and two outputs, associated with elements 63a through 63l. One input is called "IN" and the adjacent one is called "ISO"; or isolation. On the output side there is a terminal that is identified with 0° and one identified with −90°. When energy comes to the input port, going straight up, the output is 0°, going across to the other port, the output is −90°. If energy comes straight up from the isolation port, it is at −0° and energy crossing to the other port is 90°. This is called a hybrid combiner. The difference between the hybrid and the Wilkinson element is the fact that it has two inputs and the outputs have a 90° relationship with each other. That is essential to the forming of a desired antenna beam to communicate a signal associated with a particular input 61a–61l using the illustrated feed network.

FIG. 7 is a simplified structure of a prior art solution to CDMA sector synthesis (the ability to dynamically adjust the sector size and azimuthal orientation). The multiple beam antennas 701–704 in each panel are necessary to give resolution of sector azimuth in 30° increments. Beam formers 74 are Butler matrixes where each input is associated with an antenna beam (the signal applied at this interface is provided to each antenna element of the panel in a phase progression suitable for spatial combining to form the desired antenna beam). Accordingly, the 3×12 (three sectors and twelve antenna beams) switch matrix 71 (which is a subset of the 16×16 matrix) allows any of the 12 antenna beams to be selected for radiation of any of the 3 sector signals.

There are 12 beam signal inputs to allow for switching in and out 30° increments of sector azimuth. Thus, the beam signals are discrete at the beam forming matrix 72 inputs. This requires at least 12 LPAs 75 (one for each beam signal). In the preferred embodiment of the prior art, a distributed amplifier system is used to distribute the load so that at all times the signals are balanced over the LPAs. This provides for fault tolerance (if one amplifier fails, no single antenna beam signal is lost, but rather all are degraded slightly). Distributed amplifiers typically required LPAs in the power of 2 so where 12 signals were to be amplified, a 16 LPA distributed amplifier suite was required. This is an expensive waste of amplifiers and power.

The system of FIG. 7 requires a phase progression very close to 0 between the signals used in synthesizing a sector. If the alpha sector is to use beams 1, 2, 3, and 4, hybrid matrix 73 switches the alpha sector signal to the top four outputs antennas 701–704 and these signals ultimately arrive with a 0,0,0,0 phase progression.

Figure 1:
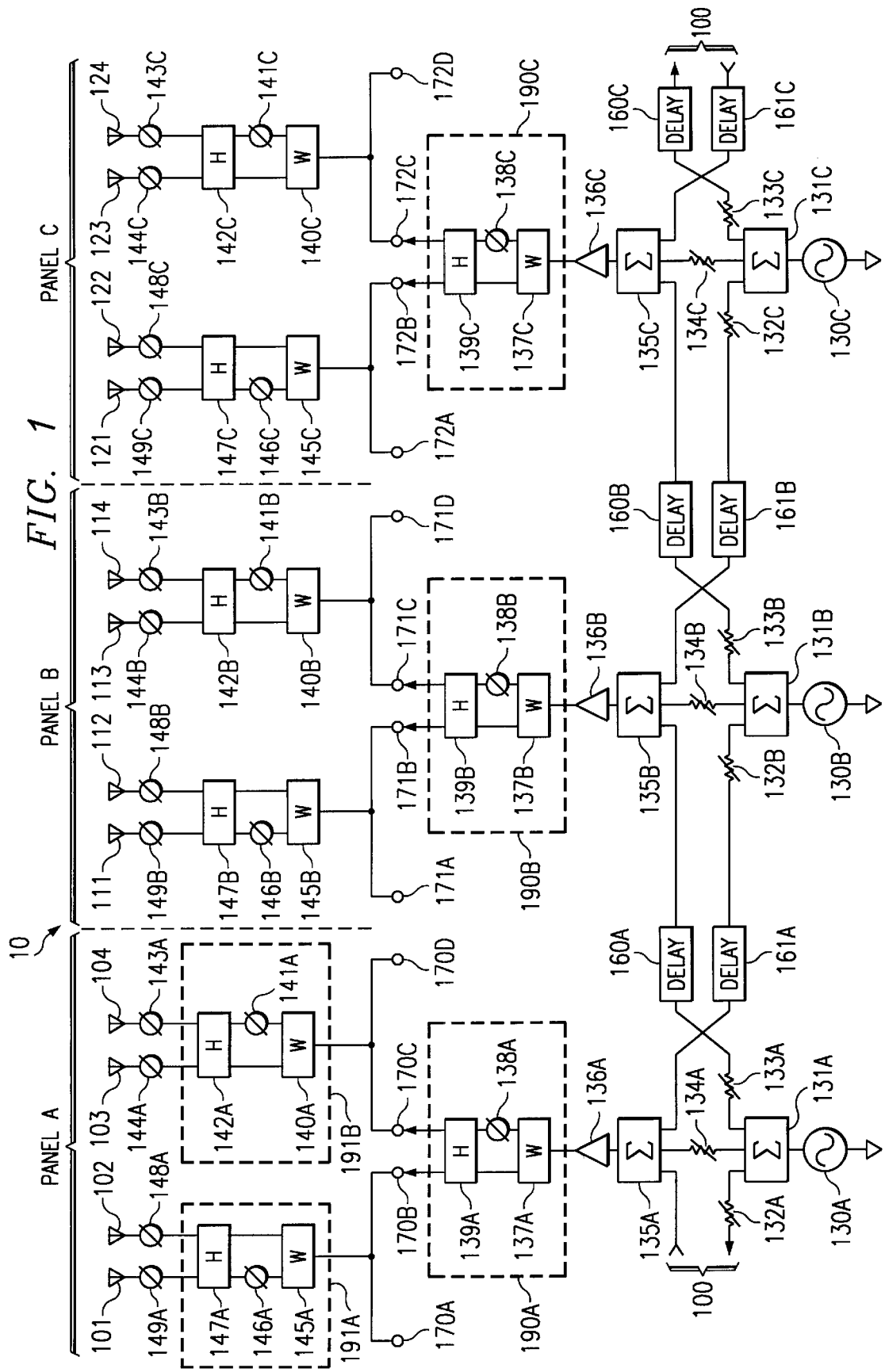
FIG. 1 shows one embodiment of a system using the concepts and methods of this invention.

Turning now to FIG. 1, there is shown system 10 which is one embodiment of the invention. Advantageously, three RF signals from radios 130A, 130B and 130C are fed via inputs 130A, 130B and 130C respectively. These radio signals could come from, for example, CDMA inputs. There are three antenna panels A, B and C, each having circuitry and a method of operation which are identical to each other.

The RF signal from input 130A goes to the input of reverse summer 131A. The three outputs of summer 131A can each be attenuated by elements 132A, 133A and 134A. These elements can be, for example, stepped or variable attenuators The output of element 133A goes to delay device 160A, which advantageously can be, for example, a SAW device. The purpose for this delay will become understood in conjunction with the discussion of the construction of signal sectors using multiple panels with respect to FIG. 5.

Assuming now a sector to be formed using a single panel, then elements 132A and 133A are controlled to block the signal from radio 130A from going to either panel B or panel C. The control of these elements can be either manually, or as contemplated, remotely, by a control device, not shown, but which could be a computer in wireless or wireline communication with elements 132A, 132B, 132C, 133A, 133B, 133C, 134A, 134B and 134C.

Since we have assumed that panel A will radiate signals only from radio 130A, then the input to summer 135A comes from element 134A which is adjusted to allow the full signal from input 130A to be presented to the input of summer 134A. Summer 135A can advantageously be, for example, a Wilkerson combiner. The output of summer 135A, which in this case is the same as the input from 130A, passes to the input of linear power amplifier (LPA) 136A which can be a high power feed forward linear amplifier. LPA typically would be the same LPA as would be found in a traditional CDMA system where its input would come directly from source/radio 130A. Thus, in system 10, the three LPAs of a traditional CDMA are maintained.

The output of LPA 136A goes to a splitter, such as splitter 137A, which advantageously can be a Wilkerson splitter. The outputs of a Wilkerson splitter are equal in magnitude and phase. One output is then phase shifted by phase control device 138A, which device can be, for example, a stepped transmission line/PIN diode/variable phase shifter. The out-of-phase signals from Wilkerson 137A are then provided as inputs to hybrid 139A. The degree of phase difference introduced by device 138A controls the relative power outputs of device 139A. Device 138A can be controlled manually, or remotely, for example, by a computer connected by wireline or radio control, not shown. The combination of elements 137A, 138A and 139A form a control circuit 190A which can, if desired, be constructed as a single unit.

Each output of hybrid 139A goes to a pair of antennas 101, 102 or 103, 104 via either terminal 170B or 170C. These antennas advantageously can be antenna columns, such as shown in the above-identified patent application entitled SYSTEM AND METHOD FOR FULLY SELF-CONTAINED CALIBRATION OF AN ANTENNA ARRAY. The relative amount of power applied to each antenna and the relative phase of the RF signal determines the geographical sector covered by the radiation pattern. This is discussed in detail in the aforementioned patent application. Thus, the phase delay, if any, introduced by element 138A begins this power distribution of the RF signal among the four antennas. The power distribution between each pair of antennas is controlled by the respective 190A control circuits as previously discussed.

Thus, as can be seen with respect to antennas 101 and 102, Wilkerson 145A has two outputs equal in power and phase to each other, with one output being phase adjusted by element 146A, if necessary for proper power distribution between antennas 101 and 102. Element 191A is the same as element 190A. Hybrid 147A then serves to divide the power between its two outputs and provides those outputs to phase adjustment circuits 149A and 148A which circuits, in turn, control the phase relationship of the signals as they are presented to antennas 101 and 102, respectively. Elements 149A and 148A advantageously can be a variable phase shifter using a variable dielectric medium or stepped like a PIN diode phase shifter.

This same operation occurs with respect to the signals going to antennas 103 and 104 from the other (170C) output of circuit 190A. Elements 140A, 141A, 142A operate exactly as do elements 145A, 146A and 147A, respectively. Thus, the power that was initially split from LPA 136A into two signals at terminals 170B and 170C having a particular controlled power differential therebetween is again split into four signals, all having a particular controlled power differential therebetween. These four signals are phase adjusted and presented to the four antennas of panel A that make up the sector. (PANEL A). Note that power is adjusted between the antennas and is not lost.

This same operation is occurring with respect to panels B and C, except that for each panel the relative power levels and phases are set for optimization of those panels.

Figure 2:
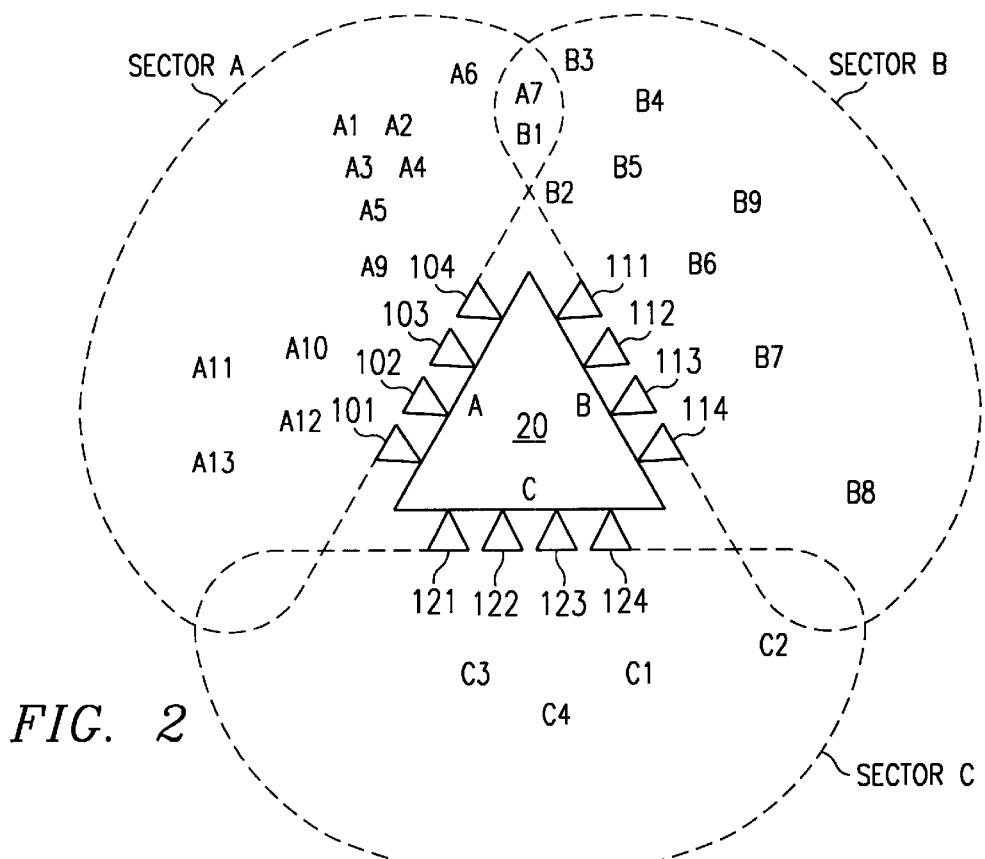
FIGS. 2–4 show various sectors arranged under control of the system and methods of this invention.

FIG. 2 shows the four antennas (20) of each panel A, B and C radiating signals which form the three sectors A, B and C. As can be seen, sector A is created in a manner such that mobile units A1–A13 can communicate via that sector. Sector B handles mobile units B1–B9 while sector C handles mobiles C1–C4. Because of the overload in sector A and the relative underload in sector C (or for other reasons) it may be desired to modify the radiation patterns and create different sector geometries.

Figure 3:
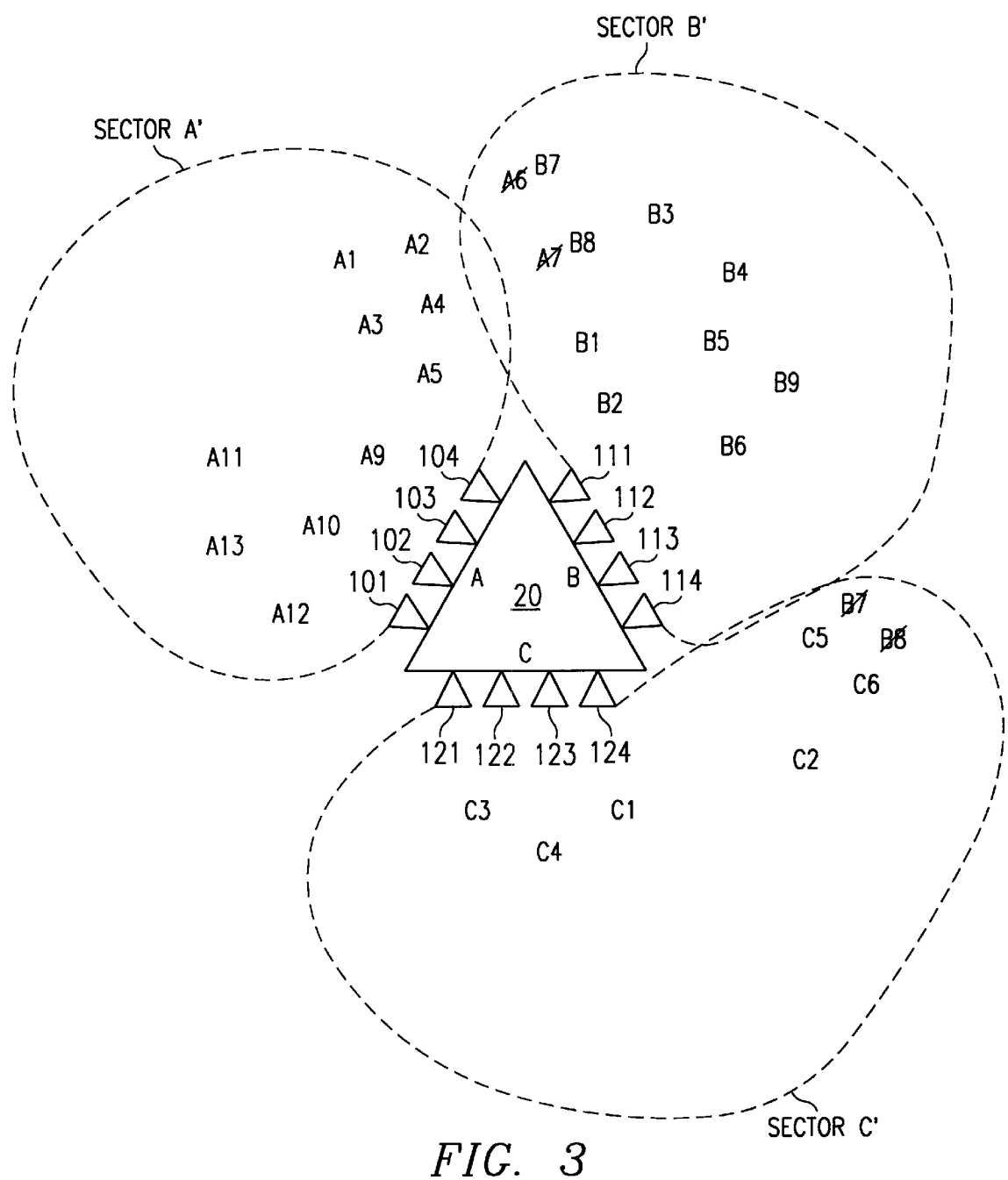

FIG. 3 shows such a different geometry, which has been created by changing the relative power and phase angles of the signals arriving at antennas 101–104, 111–114 and 121–124 in the manner previously discussed with respect to FIG. 1. Now different mobiles can be handled by different sectors to more evenly balance the intersector loading. Note that sector B now handles mobiles A6 and A7 from sector A, while sector C now handles mobiles B7 and B8 formerly handled by sector B.

Figure 4:
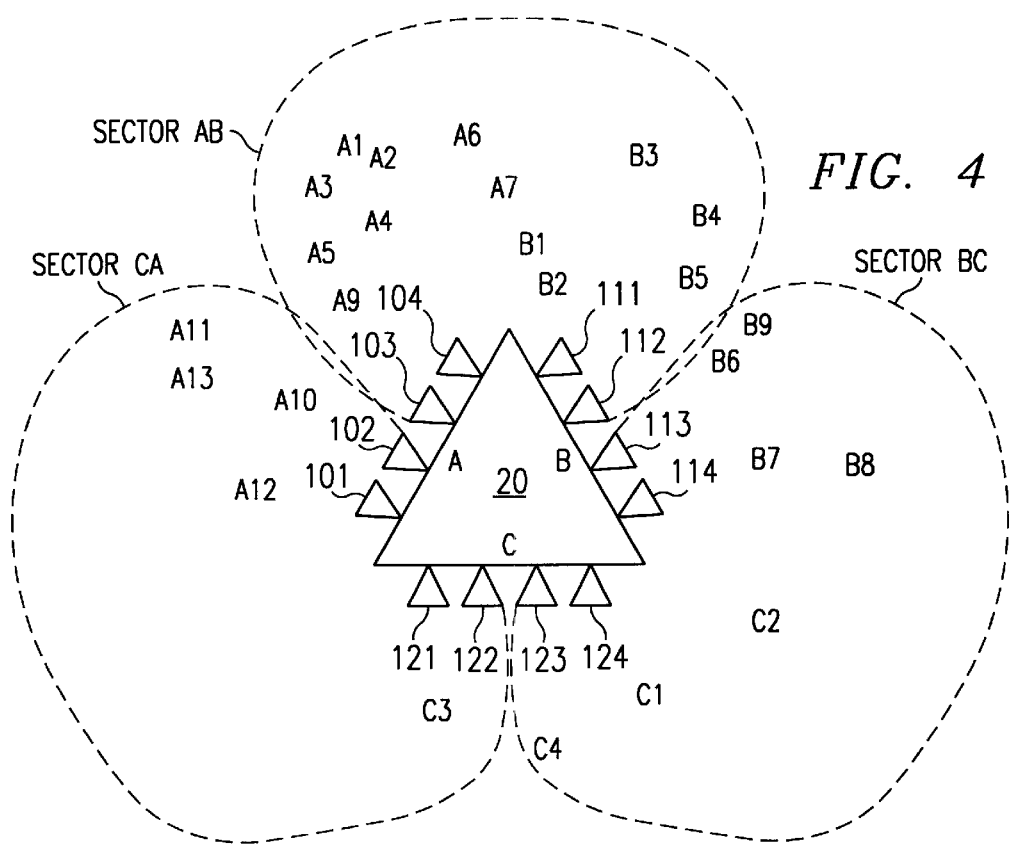

FIG. 4 shows the situation where it is desired to create the sectors by using antennas partially from one panel and partially from an adjacent panel. Thus, as shown in FIG. 4, system 20 has created sector A/B by using antennas 103, 104, 111 and 112.

Figure 5:
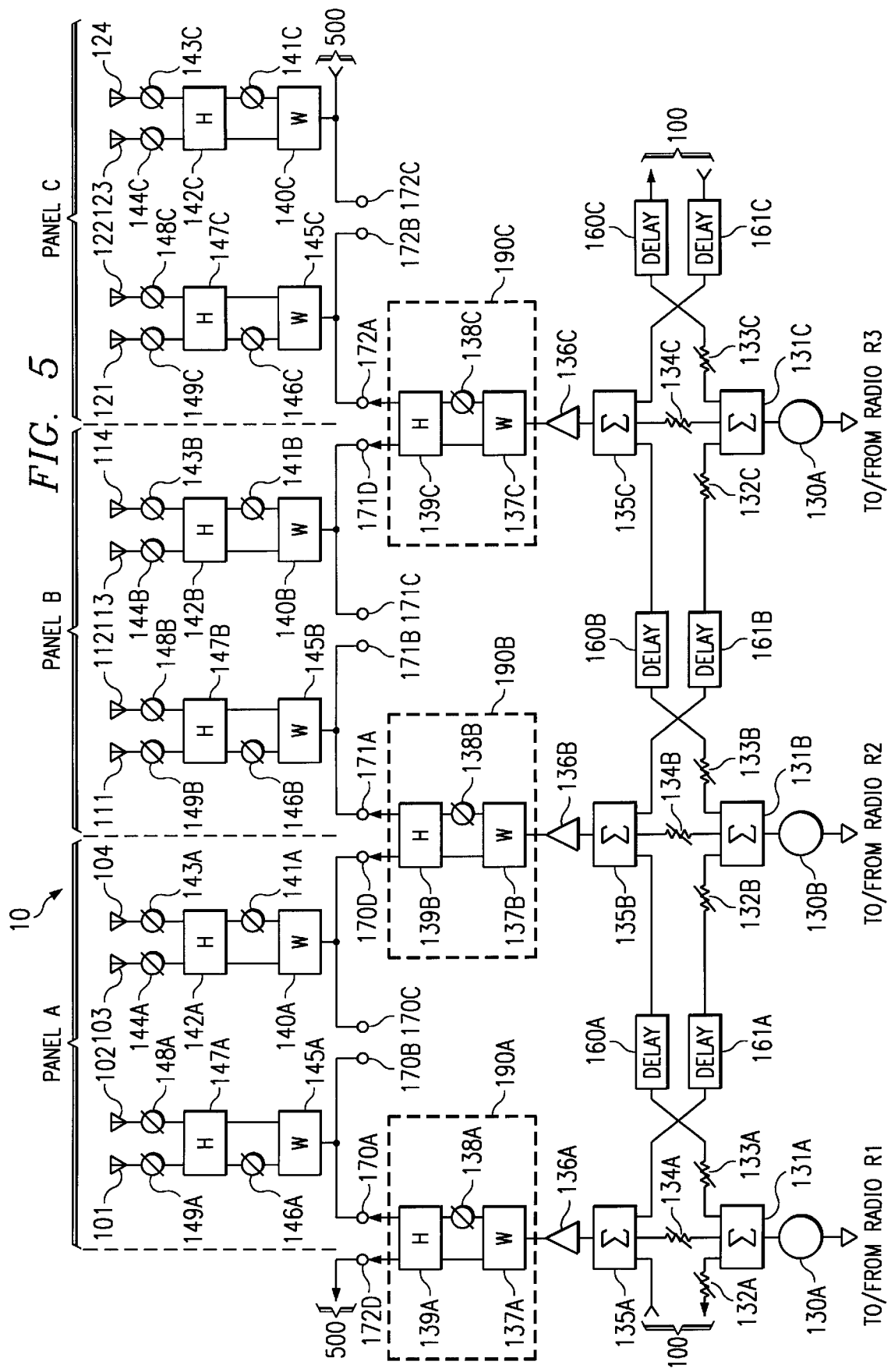
FIG. 5 shows the system configuration that results in the sector pattern shown in FIG. 4.

The pattern of FIG. 4 is created as shown in FIG. 5 where the signal from radio 130A is directed, via the proper attenuation of elements 132A, 133A and 134A so that the radio 130A signal is delayed (or advanced) by element 160A for presentation to summer 135B and then to LPA 136B. Similarly, RF signal from radio 130B is directed to LPA 136C while the RF from radio 130C is presented to LPA 136A. Because the output of hybrids 139A, 139B and 139C (circuit 190A) have each been switched to different antenna input circuits via terminals 172D, 170A, 170D and 171A there results in a different output sector pattern. Note that originally in FIG. 1 the output of circuit 190B went to antennas 111, 112, 113 and 114, all on panel B, and now, as shown in FIG. 7, the output of circuit 190B goes to antennas 103 and 104 in panel A and antennas 111 and 112 in panel B.

The signal from radio 130C would then pass via elements 133C and 160C to summer 135A for presentation to antenna elements 123, 124, 101 and 102. Radio 130B would go via elements 133B, 160B, 135C for presentation to antennas 113, 114, 121 and 122. In this manner a cross-panel antenna set is used to create the sector pattern.

Delays 160A, 160B and 160C are used to adjust for the difference in signal lengths from panel to panel and is optional if desired. All delays are set either manually or remotely by a computer as desired.

Note that had it been desired to radiate radio 130A via panels A/C (instead of via panels A/B), then signal 130A would pass through element 134A and go from circuit 190A to terminals 172D and 170A.

Figure 8:
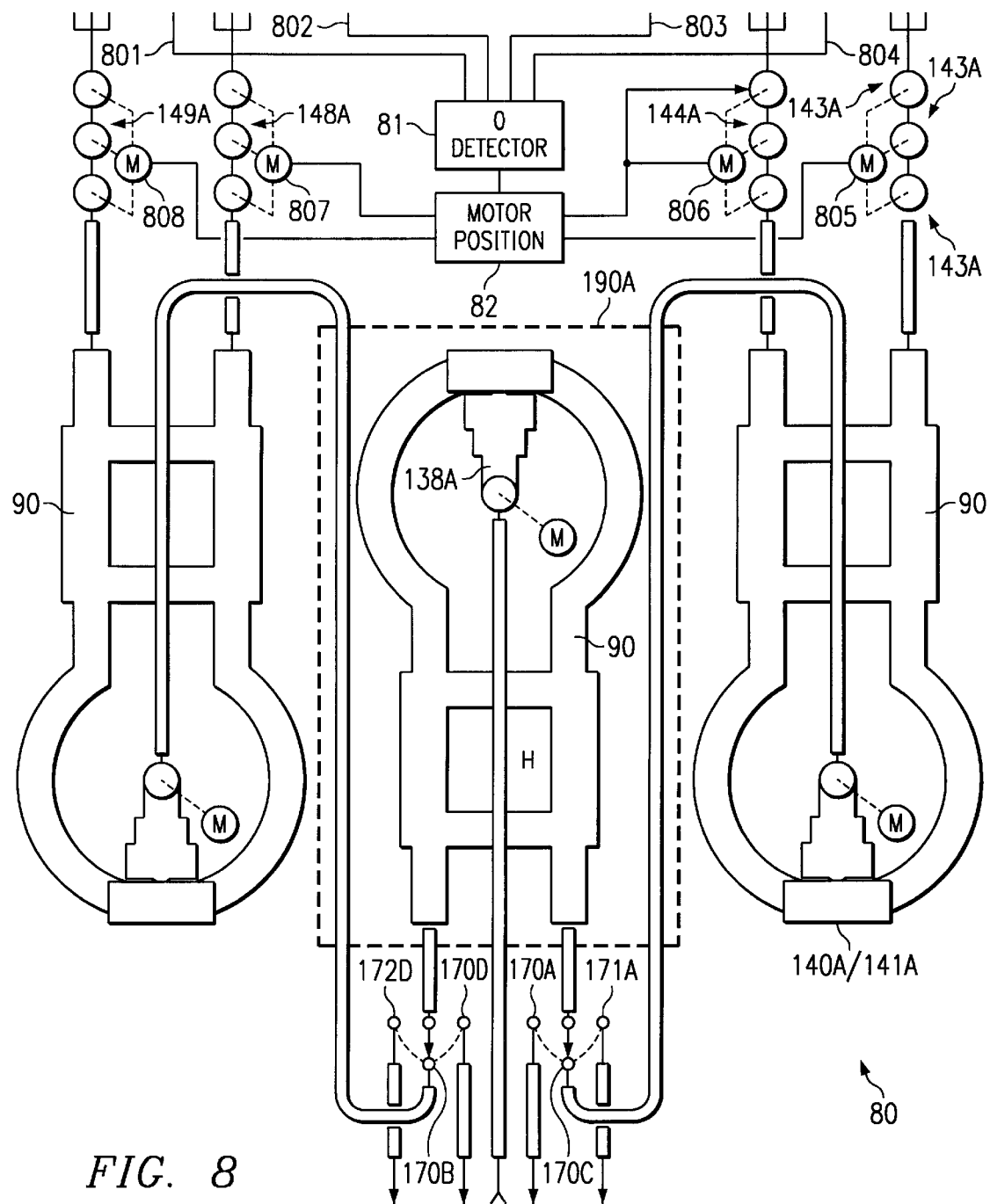
FIGS. 8, 9 and 10 show a specific embodiment of the invention.
Figure 8:
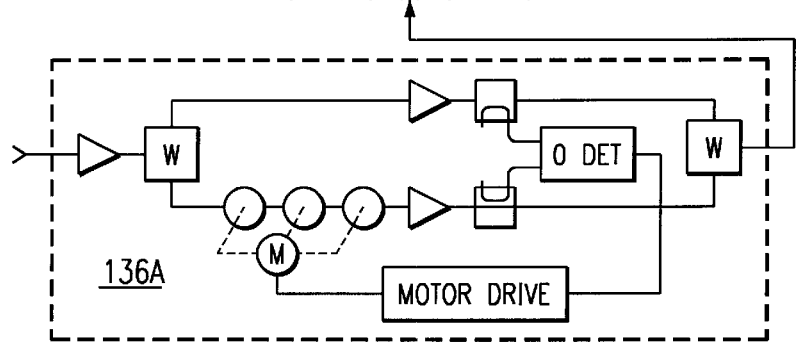
Figure 9:
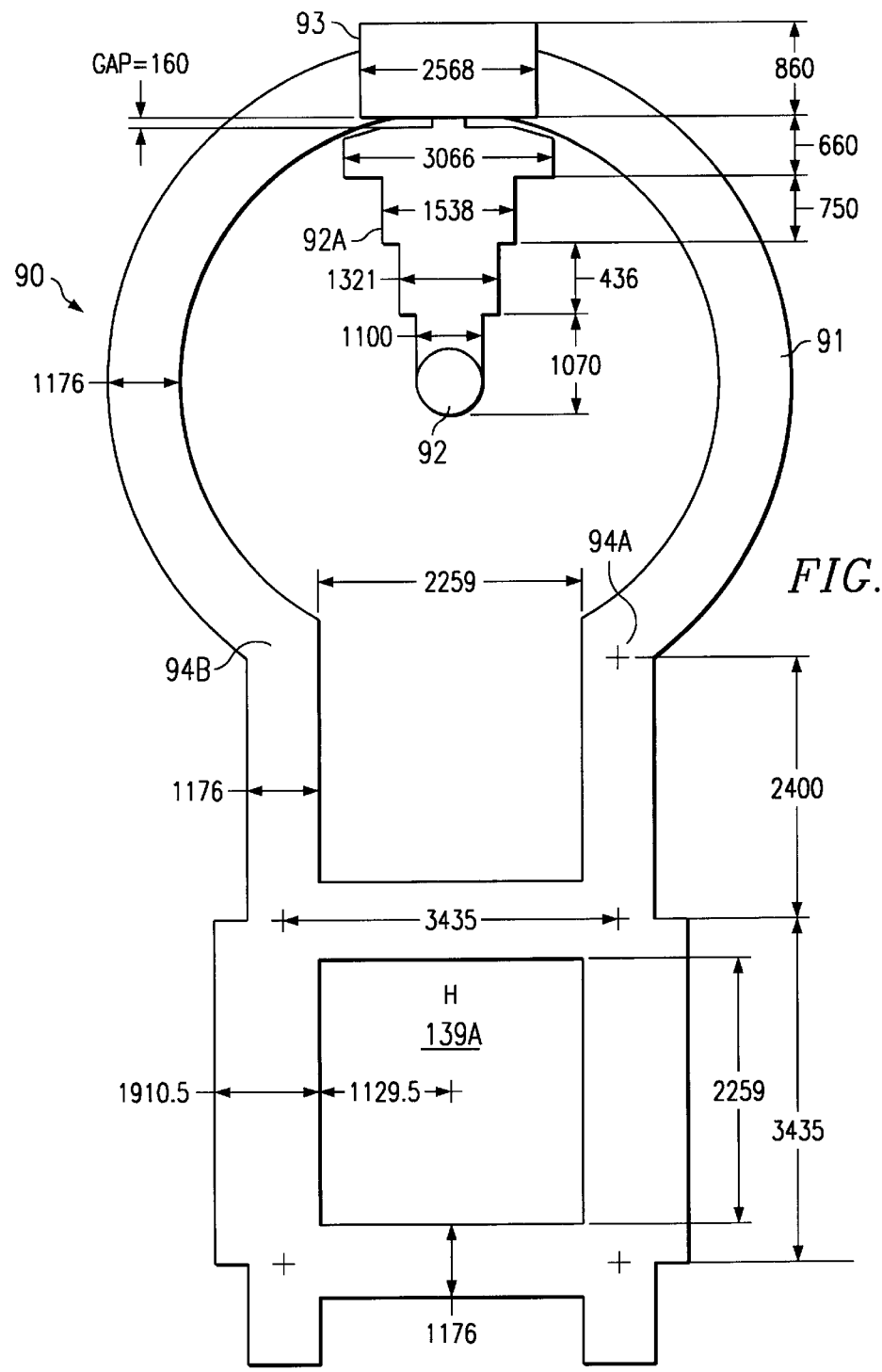
Figure 10:
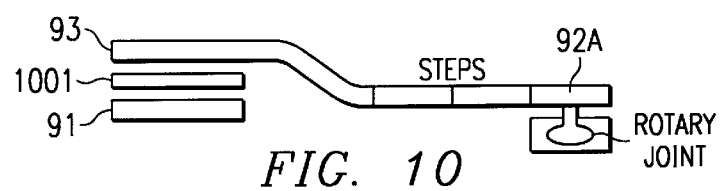

FIGS. 8, 9 and 10 show a specific embodiment of the inventive concepts, including the best mode contemplated in constructing the system for efficient operation. FIG. 9 shows the relative dimensions in mils for operation at 850 Mhz.

As shown in FIG. 8, phase can be detected from each antenna by probes 801–804 and brought to phase detector 81 for processing. Detector 81 can then drive motor position control 82 which, in turn, adjusts elements 143A, 144A, 148A and 149A via motors 805–808, respectively. These elements are adjusted for the purposes discussed above.

As shown in FIG. 9, energy comes into element 90 (which forms element 190A, FIG. 1) via a probe (not shown) at point 92 and is delivered to pad 93 through step transformer 92A.

Pad 93 sits on teflon pad 1001 (FIG. 10) riding on circular air line 91. Energy is split and flows around circular air line 91 which corresponds to the input points of hybrid 139A of FIG. 1. (The circular air line and pad operate as both Wilkerson 137A and phase shifter 138A of FIG. 1).

The stepped transformer 92A is on the same plane as circular air line 91 with a step or goose neck at pad 93 to allow pad 93 to slide on circular air line 91 as shown in FIG. 10.

Hybrid 137A is, for example, a copper stamp microstrip or strip line

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for delivering an RF signal to a plurality of antennas, said system comprising:

a source of RF signals;

a linear power amplifier (LPA) for accepting said RF signals and for boosting the power level of said accepted RF signals;

a splitter for separating said boosted RF signals into substantially equal components;

a hybrid circuit for accepting as inputs the split RF signal components and for apportioning the power level output of said hybrid among a plurality of RF signal output components equal in number to the number of input components, whereby the power level of each said output component is in proportion to the phase relationship between each of said RF input signal components such that substantially all of the power delivered by said LPA is delivered to the sum of said hybrid outputs; and circuitry for delivering the RF output from each of said hybrid outputs to a first set of antennas.

2. The circuit of claim 1 wherein said last-mentioned circuit includes a circuit for adjusting the phase of each signal delivered to an antenna.

3. The circuit set forth in claim 2 further including:

additional splitters connected to each output of said hybrid, each such additional splitter for separating said hybrid output into substantially equal additional splitter output components; and a hybrid circuit for accepting as inputs each said additional split RF signal output components and for apportioning the power level output of said hybrid among a plurality of RF signal output components equal in number to the number of input components, whereby the power level of each said output component is in proportion to the phase relationship between each of said RF input signal components such that substantially all of the power delivered by said LPA is delivered to the sum of said hybrid outputs; and circuitry for delivering the RF output from each of said hybrid outputs to at least one antenna.

4. The circuit of claim 3 wherein said last-mentioned circuit includes a circuit for adjusting the phase of each signal delivered to an antenna.

5. The system of claim 1 further including:

at least a second input for receiving RF signals;

a second linear power amplifier (LPA) for accepting received RF signals and for boosting the power level of said received RF signals;

a splitter for separating said boosted RF signals into substantially equal components;

a hybrid circuit for accepting as inputs the split RF signal components and for apportioning the power level output of said hybrid between two RF signal output components equal in number of input components, whereby the power level of each said output component is in proportion to the phase relationship between each of said RF input signal components such that substantially all of the power delivered by said LPA is delivered to the sum of said hybrid outputs; and circuitry for delivering the RF output from each of said hybrid outputs to a second set of antennas.

6. The system of claim 5 further including means for shifting the RF inputs among said antenna sets.

7. The system of claim 6 wherein said shifting means includes means for shifting said received RF signals between said LPAs.

8. A system for delivering an RF signal to a plurality of antennas, said system comprising:

a source of RF signals;

a linear power amplifier (LPA) for accepting said RF signals and for boosting the power level of said accepted RF signals;

a splitter for separating said boosted RF signals into two substantially equal components;

a hybrid circuit for accepting as inputs the split RF signal components and for apportioning the power level output of said hybrid between two RF signal output components, whereby the power level of each said output component is in proportion to the phase relationship between each of said RF input signal components such that substantially all of the power delivered by said LPA is delivered to the sum of said hybrid outputs;

first and second additional splitters each connected to a respective one of said outputs of said hybrid, each such additional splitter for separating said hybrid output into substantially equal additional splitter output components, thereby creating four RF components;

additional hybrid circuits each for accepting as inputs two of said additional split RF signal output components and each for apportioning the power level output of each said hybrid between two RF signal output components to create four RF outputs, whereby the power level of each said outputs is in proportion to the phase relationship between each of said RF input signal components such that substantially all of the power delivered by said LPA is delivered to the sum of the four additional hybrid outputs; and circuitry for delivering the RF output from each of said additional hybrid outputs to four antenna.

9. The system of claim 8 wherein said circuitry includes phase adjusters for adjusting the phase of each signal delivered to an antenna.

* * * * *